(12) United States Patent
Takahashi

(10) Patent No.: US 7,738,005 B2
(45) Date of Patent: Jun. 15, 2010

(54) IMAGE FORMING APPARATUS

(75) Inventor: Masayoshi Takahashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 11/404,292

(22) Filed: Apr. 13, 2006

(65) Prior Publication Data
US 2006/0256182 A1 Nov. 16, 2006

(30) Foreign Application Priority Data
May 12, 2005 (JP) .............................. 2005-139757

(51) Int. Cl.
B41J 2/47 (2006.01)
B41J 2/435 (2006.01)
(52) U.S. Cl. ...................... 347/235; 347/250
(58) Field of Classification Search ....................... None
See application file for complete search history.

(56) References Cited
U.S. PATENT DOCUMENTS
5,369,272 A * 11/1994 Eguchi ....................... 250/235

2001/0003463 A1* 6/2001 Tanimoto et al. ............ 347/235
2004/0119003 A1* 6/2004 Ikeda ......................... 250/234
2006/0050139 A1* 3/2006 Inagawa et al. ............. 347/236

FOREIGN PATENT DOCUMENTS
JP 11-101947 A 4/1999

* cited by examiner

Primary Examiner—Matthew Luu
Assistant Examiner—Kendrick X Liu
(74) Attorney, Agent, or Firm—Canon USA Inc IP Division

(57) ABSTRACT

At least one exemplary embodiment is directed to an image forming apparatus using a plurality of laser beams that includes a unit configured to detect a main scanning synchronization signal per beam while performing a laser light amount control per beam for each predetermined line, and a unit configured to produce a main scanning synchronization signal of a beam whose main scanning signal is not detected, by using the main scanning synchronization signal of the detected beam.

2 Claims, 9 Drawing Sheets

FIG.8
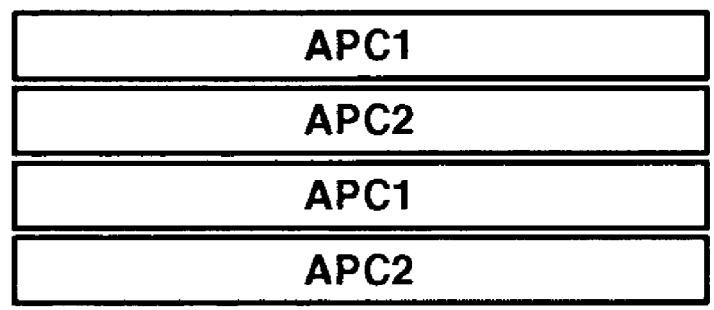
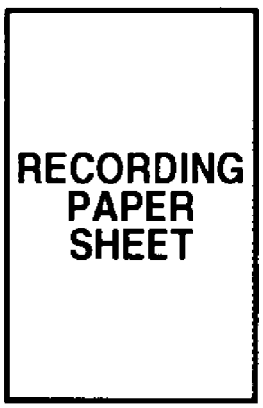
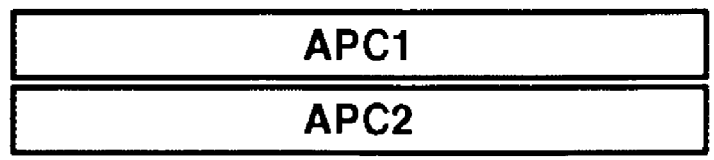

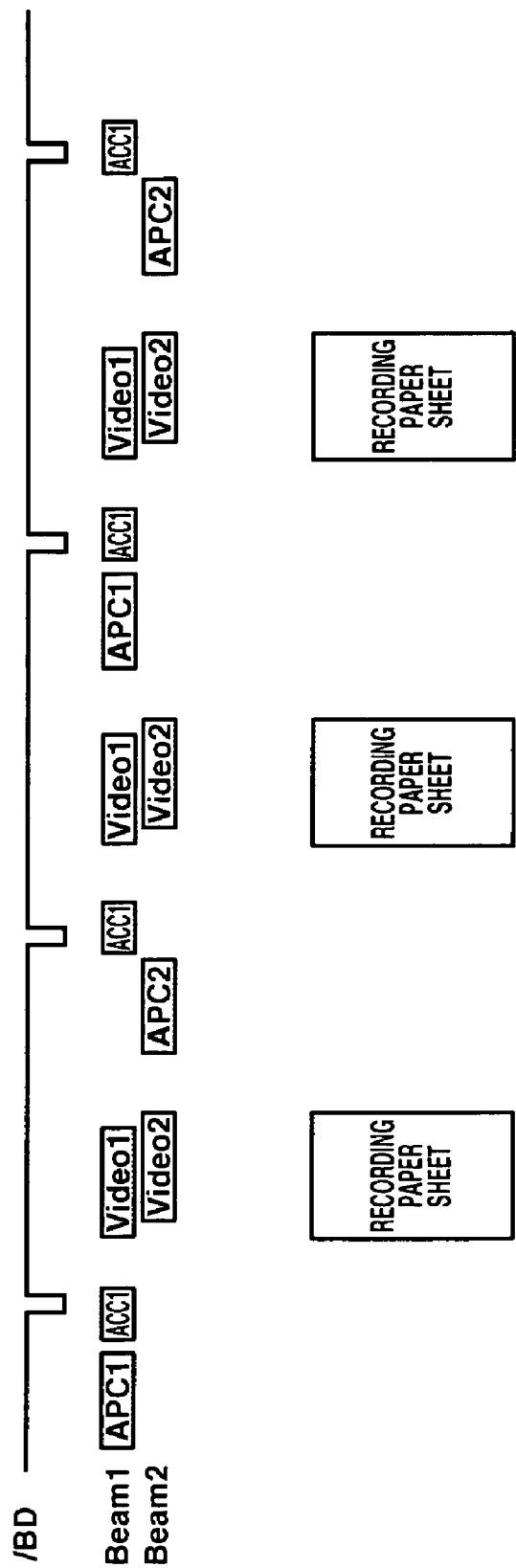

IMAGE FORMING APPARATUS

BACKGROUND OF THE INVENTION

1. Field of the Invention

The present invention relates to an image forming apparatus that can use an electrophotographic process. More specifically though not exclusively, the present invention relates to a color image forming apparatus that can form color images of different colors by using a plurality of laser beams.

2. Description of the Related Art

The relationship between an electric current that is supplied to a laser diode and its optical output differs in accordance with the type of laser diode. Further, the relationship between the current and the optical output differs also in accordance with a heat generated by the laser diode itself. Thus, a laser cannot be appropriately emitted by an open loop constant current control. Therefore, it can be necessary in some circumstances to perform a control so that a desired level of the optical output can be obtained by monitoring the output of the laser. The control is referred to as an automatic power control (APC). FIG. 5 illustrates a laser control circuit that performs the APC.

The laser control circuit includes a constant current circuit 501, a switching circuit 502, and an amplifier 503. The constant current circuit 501 is a voltage-current converter that causes an electronic current I1 to flow in accordance with a light amount signal 504 from a control device (CPU) 510. The switching circuit 502 switches the current I1 by a laser lighting signal 505. A laser diode 506 emits a light in accordance with an operation of the switching circuit 502.

An amount of the emission of light from the laser diode 506 is detected as an electronic current value by a light detector 507, and the detected current value is converted into a voltage value by a resistor 508. The light emission amount that has been converted into the voltage value is amplified by the amplifier 503, and converted into a light emission amount signal 509. The control device 510 monitors the light emission amount signal 509 and increases/decreases the level of the light amount signal 504.

FIG. 6 is a flow chart that illustrates the APC operation. After the start of the APC (S1) and after causing a laser compulsory lighting signal to be active, the light emission amount signal is monitored (S2). If the light emission amount signal (also referred to as the light amount signal) is lower than a desired value, the level of the light amount signal is increased by one step (S3). On the other hand, if the light emission amount signal is higher than the desired value, the level of the light amount signal is decreased by one step (S5). Then, when the level of the light emission amount signal is adjusted to the desired value, the APC operation ends (S4).

FIG. 7 illustrates a timing of the APC operation using a semiconductor light emitting element that emits a plurality of laser beams. "APC 1" denotes the APC operation timing of a beam 1, and "APC 2" denotes the APC operation timing of a beam 2.

As illustrated in FIG. 7, APC2 is performed at a first predetermined timing, and next, APC1 is performed at a second predetermined timing. Contemporaneously, a main scanning synchronization signal BD1 of the beam 1 is detected. Then, when a main scanning synchronization signal BD2 of the beam 2 is detected, the APC 2 or a laser light emission ACC2 (hereinafter simply referred to as ACC) in which no APC is performed is carried out. Thus, the APC is performed to each laser for each line.

Further, as illustrated in FIG. 8, the APC can be performed between paper sheets.

Further, as illustrated in FIG. 9, there is a case where APC operations are repeatedly and alternatively performed for each line in an order of APC1, APC2, APC1. When the main scanning synchronization signal is detected, only the beam 1 is detected by a laser light emission ACC1 which performs no APC1.

Japanese Patent Application Laid-Open No. 11-101947 discusses related art thereto.

However, in the conventional technologies, the APC is performed for each laser beam per each line. Therefore, the time required for the APC can be lengthy for some uses, because it takes twice as a long time as a one-beam laser in the case of a two-beam laser, and four times as long as a one beam laser in the case of a four-beam laser. Therefore, when the time spent for the APC is limited, it can be difficult to effectively and appropriately perform the APC.

In addition, in the case where the APC is performed between the paper sheets, the light amount for the overall area of the sheet may not be appropriately secured. Therefore, the density of an image is not the same on the paper between where printing started and where printing ends.

In addition, there is a case where the APC operations are repeatedly and alternatively carried out for each line in an order such as APC1, APC2, APC1, . . . and only the beam 1 is detected by the laser mission control. In this laser emission, no APC is performed when the main scanning synchronization signal is detected. In such a case, since the time for detecting the main scanning synchronization has to be taken, the APC cannot be performed in a sufficiently long time period.

SUMMARY OF THE INVENTION

At least one exemplary embodiment is directed to detecting a main scanning synchronization signal per each beam while performing a laser light amount control per one beam. At least one exemplary embodiment is also directed to shortening a time necessary for performing an APC between lines by detecting the main scanning synchronization signal only in relation to a predetermined beam in an appropriate order.

In at least one exemplary embodiment, an image forming apparatus includes: a light emitting element configured to emit a plurality of laser beams; a scanner configured to repeatedly scan with the plural laser beams at least one scanning line that includes an image area and a non-image area on a photosensitive member; a detector configured to produce a beam detection signal by detecting a laser beam from the non-image area scanned by the scanner; an automatic power controller configured to receive the laser beam emitted by the light emitting element, detect a power of the received laser beam, and control a driving current that is supplied to the light emitting element; a timing controller configured to selectively and compulsorily cause the laser beam to be emitted so that the detector can detect the laser beam while the scanner scans the non-image area, or the timing controller can facilitate the automatic power controller in controlling the driving current, where the timing controller performs a first light emission mode in which the driving current for a first laser beam is controlled by emitting the first laser beam in the non-image area and the first laser beam is detected by the detector, and performs a second light emission mode in which the driving current for a second laser beam is controlled by emitting the second laser beam and the second laser beam is detected by the detector, by switching between the first light emission mode and the second light emission mode, per each scanning operation by the scanner; and a synchronization controller configured to control image forming timing of each of the laser beams by delaying the beam detection signal, where the timing controller changes a delay time of the beam detection signal in accordance with either one of the first light emission mode or the second light emission mode.

In another exemplary embodiment, an image forming apparatus includes: a light emitting element configured to emit a plurality of laser beams; a scanner configured to repeatedly scan with the plural laser beams on scanning lines that include an image area and a non-image area on a photosensitive member; a detector configured to produce a beam detection signal by detecting a laser beam from the non-image area scanned by the scanner; an automatic power controller configured to receive the laser beam emitted by the light emitting element, detect a power of the received laser beam, and control a driving current that is supplied to the light emitting element; a timing controller configured to serially and compulsorily cause either one of laser beams to be emitted so that each of the laser beams can be detected by the detector while the scanner scans the non-image area and where the automatic power controller can control a driving current of either one of the laser beams while the scanner scans the non-image area; and a synchronization controller configured to control an image forming timing of the corresponding laser beams in accordance with each of the beam detection signals.

According to at least one exemplary embodiment, the main scanning synchronization signal can be detected for each beam while performing the control of the laser light amount per each beam. In addition, the time for performing the APC necessary between lines can be shortened by detecting the main scanning synchronization signal only in relation to the predetermined beam in an appropriate order.

Further features of the present invention will become apparent from the following detailed description of exemplary embodiments with reference to the attached drawings.

BRIEF DESCRIPTION OF THE DRAWINGS

The accompanying drawings, are incorporated in and constitute a part of the specification.

FIG. 8 is a timing chart showing an operation according to the conventional device.

FIG. 9 is a timing chart showing an operation according to the conventional device.

DETAILED DESCRIPTION OF THE EMBODIMENTS

Figure 1:
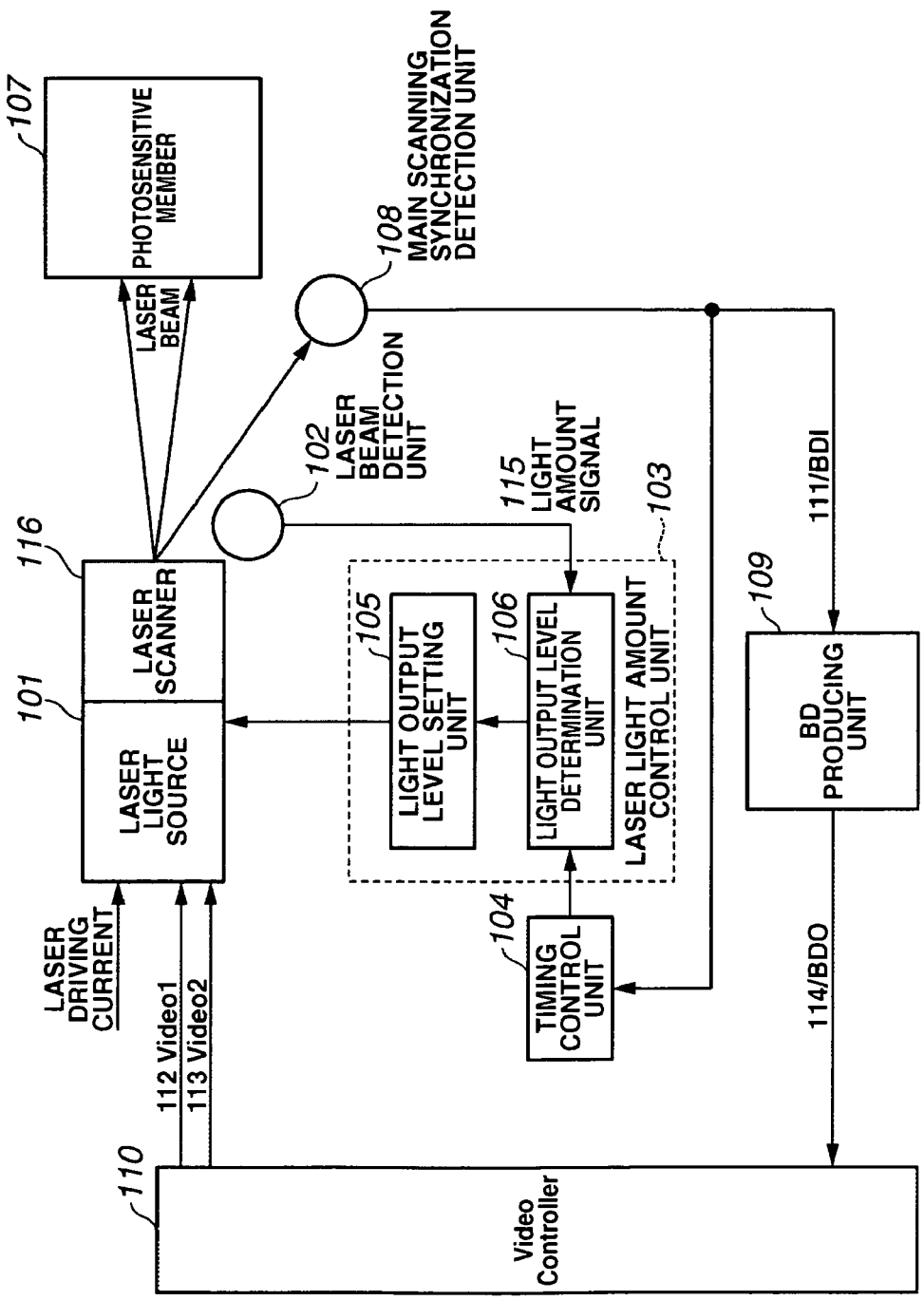
FIG. 1 is a block diagram illustrating a constitution of a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of laser diodes, and laser detectors.

In all of the examples illustrated and discussed herein any specific values should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments will now be described in detail with reference to the drawings.

First Exemplary Embodiment

FIG. 1 is a diagram that illustrates a basic constitution of a circuit according to a first exemplary embodiment of the present invention.

In FIG. 1, reference numeral 101 denotes a laser light source that generates and emits a plurality of laser beams, and reference numeral 102 denotes a laser light detection unit that detects an output of the laser beams. Reference numeral 103 denotes a laser light amount control unit that controls the laser light source 101 so that a predetermined light output level can be obtained. The laser light amount control unit 103 includes a light output level determination unit 106 and a light output level setting unit 105. Further, reference numeral 104 denotes a timing control unit that controls a timing of the laser light amount control unit 103, and reference numeral 107 denotes a photosensitive member that can form a latent image upon receiving a laser beam.

Further, a laser scanner 116 includes a rotational (e.g., polygon) mirror and repeatedly scans with light beams generated by and emitted from the laser light source 101 a scanning line of the photosensitive member 107 that includes an image area and a non-image area of the photosensitive member 107. In addition, a main scanning synchronization detection unit 108 detects the laser beam from the non-image area scanned by the laser scanner 116 and produces a detection signal.

Note that the laser light source 101 can emit a multibeam light. In this exemplary embodiment, the laser light source 101 emits a two-beam light. Here, the multibeam light is not limited to two-beam light, and any multibeam light can be employed for example a four-beam light.

Figure 2:
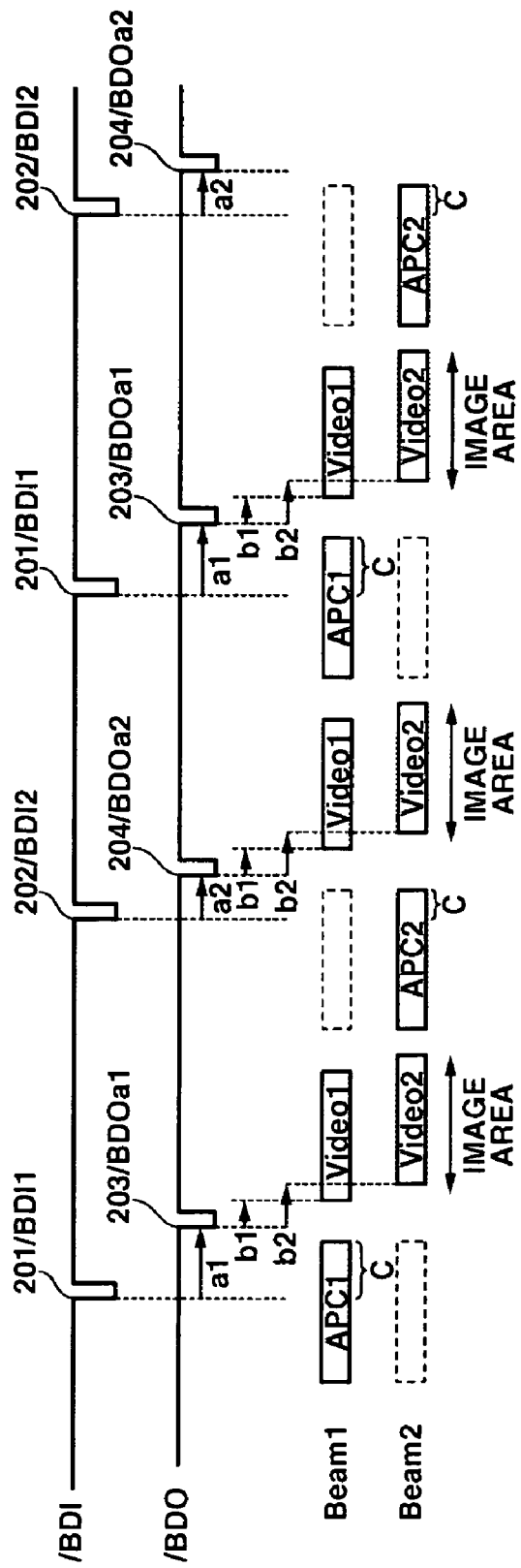
FIG. 2 is a timing chart showing an operation according to the first exemplary embodiment of the present invention.

First, when a printer (not shown) receives a print instruction, a laser driving current flows and lights the laser light source 101. The laser light detection unit 102 detects the laser light, and sends a light amount signal 115 to the laser light amount control unit 103. As illustrated in FIG. 2 (the details are to be described later), the laser light amount control unit 103 performs a light amount control so that a predetermined level of the light amount can be obtained. The laser light amount control unit 103 adjusts a timing based on the signal sent from the timing control unit 104 in order to perform the light amount control outside the image area.

In addition, a main scanning synchronization signal/BDI 111 produced by the main scanning synchronization detection unit 108 generates a main scanning synchronization signal/BDO 114 in a video output timing in a BD producing unit 109. Then, at the timing indicated by the main scanning synchronization signal/BDO 114, Video1 (112) and Video2 (113) are outputted to the laser light source 101. Then, when the predetermined level of light amount is obtained in accordance with the Video1 (112) and the Video2 (113), the laser beam is irradiated onto the photosensitive member 107, and thus, a latent image is formed thereon.

In this regard, FIG. 2 illustrates a timing chart of the light amount control according to the first exemplary embodiment of the present invention.

First, in an area outside the image area, beam 1 is emitted as an APC light (APC1), and the main scanning synchronization signal/BDI1 of the beam 1 is detected (201). This mode is hereinafter referred to as a first light emission mode. In a subsequently-performed line scanning, beam 2 is emitted as an APC light (APC2) in an area outside the image area, and then a main scanning synchronization signal/BDI2 of the beam 2 is detected (202). This mode is hereinafter referred to as a second light emission mode. In a next line scanning, beam 1 is emitted as an APC light (APC1) in the area outside the image area, and the main scanning synchronization signal/BDI1 of the beam1 is detected (201). Thus, the detection of the main scanning synchronization signal (BDI) can repeatedly be performed while performing the light amount control of the beam. In this way, the main scanning synchronization signal/BDI1 (201) for the beam 1 and the main scanning synchronization singla/BDI2 (202) are detected. After the main scanning synchronization signal/BDI is detected, the APC control is continued for an arbitrary or a predetermined time period c so that the APC control is performed for a sufficiently long time period.

When the BD producing unit 109 detects the main scanning synchronization signal/BDI1 (201) in the first light emission mode, a main scanning synchronization signal/BDOa1 (203) is produced later than the time of production of the related main scanning synchronization signal/BDI1 (201) by a time period a1. On the other hand, when the BD producing unit 109 detects the main scanning synchronization signal/BDI2 (202) in the second light emission mode, a main scanning synchronization signal/Bdoa2 (204) is produced later than the time of production of the related main scanning synchronization signal/BDI1 (202) by a time period a2. Note that the time a1 and the time a2 are set so that the main scanning synchronization signal/BDOa1 (203) and the main scanning synchronization signal/BDOa2 (204) are produced at the same timing. For example, the time a1 can be set to be longer than the time a2 by a length of time corresponding to a distance between the laser beams in the main scanning direction. Note that the time spacing between subsequent 203/BDOa1 and 204/BDOa2 can vary. For example if the time difference between the first 201/BDI1 and 202/BDI2 signal is 10 units, and a1 is 3 units and a2 is 2 units, the time difference between the first set of 203/BDOa1 and 204/BDOa2 signals is, for this non-limiting example, 9 units. The subsequent time difference between 204/BDOa2 and the second 203/BDOa1 is now 11 units, where subsequent differences alternate between 9 and 11 units for this example. Alternatively, the time spacing between the 201/BDI1 and 202/BDI2 signals can be varied so that the time spacing between 203/BDOa1 and 204/BDOa2 signals remains constant.

When the main scanning synchronization signal/BDO (203/BDOa1, or, 204/BDOa2) is inputted, and a predetermined time period b1 passes after production of the main scanning synchronization signal 203/BDOa1 or 204/BDOa2 begins, a video controller 110 outputs Video1 of the beam 1, and then beam 1 is emitted. The Video2 of the beam 2 is outputted when a predetermined time period b2 passes after production of the main scanning synchronization signal 203/BDOa1 or 204/BDOa2 begins, and then beam 2 is emitted.

In the first exemplary embodiment, regardless of whether either of the main scanning synchronization signal/BDI1 or the main scanning synchronization signal/BDI2 (202) is detected, one main scanning synchronization signal/BDOa1 or a2 is produced at a time by the BD producing unit 109, and therefore, the video controller 110 can output the video signal at one specific timing.

In the above processing, the main scanning synchronization signal/BDI is detected per one beam while performing the laser light amount control per one beam and the main scanning synchronization signal/BDI1 (201) is detected by detecting only the predetermined beam in an appropriate order. Thus, the APC time required between the lines can be shortened.

Second Exemplary Embodiment

Figure 3:
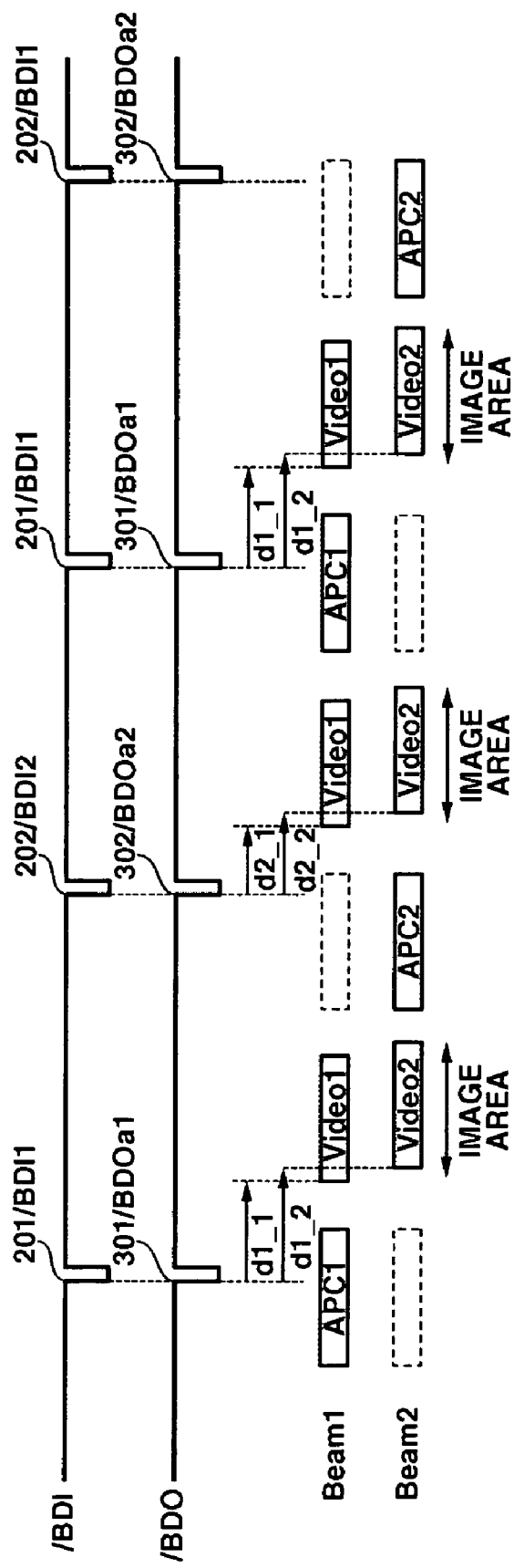
FIG. 3 is a timing chart showing an operation according to a second exemplary embodiment of the present invention.

FIG. 3 illustrates a timing chart of the light amount control according to a second exemplary embodiment of the present invention. Note that portions that are the same as those in the first exemplary embodiment are provided with the same reference numerals. In addition, also FIG. 1 is used for the explanation of the second exemplary embodiment.

First, in an area outside the image area, beam 1 is emitted as an APC light (APC1), and the main scanning synchronization signal/BDI1 of beam 1 is detected (201). This mode is hereinafter referred to as a first light emission mode. In a subsequently-performed line scanning, beam 2 is emitted as an APC light (APC2) in an area outside the image area, and then a main scanning synchronization signal/BDI2 of the beam 2 is detected (202). This mode is hereinafter referred to as a second light emission mode. In a next line scanning, beam 1 is emitted as an APC light (APC1) in the area outside the image area, and the main scanning synchronization signal/BDI1 of the beam 1 is detected (201). Thus, the detection of the main scanning synchronization signal (BDI) is repeated while performing the light amount control of the beam, and in this way, the main scanning synchronization signal/BDI1 (201) for the beam 1 and the main scanning synchronization singla/BDI2 (202) for the beam 2 are detected.

Then, when the main scanning synchronization signal/BDI1 (201) is inputted, the BD producing unit 109 produces the main scanning synchronization signal/BDO1 (301) produced at the same timing as the main scanning synchronization signal/BDI1 (201). When the main scanning synchronization signal/BDI2 (202) is inputted, the BD producing unit 109 produces the main scanning synchronization signal/BDO2 (302) at the same timing as the main scanning synchronization signal/BDI1 (202).

When the main scanning synchronization signal/BDO1a1 (301) is inputted, and a predetermined time period d1_1 passes after production of the main scanning synchronization signal 301/BDO1a1 begins, the video controller 110 outputs Video1 of the beam 1, and then beam 1 is emitted. The Video2 of the beam 2 is outputted when a predetermined time period d1_2 passes after production of the main scanning synchronization signal 301/BDO1a1 begins, and then beam 2 is emitted.

Then, when the main scanning synchronization signal/BDO2a2 (302) is inputted, and a predetermined time period d2_1 passes after production of the main scanning synchronization signal 302/BDOa2 begins, a video controller 110 outputs Video1 of the beam 1. Then, beam 1 is emitted. The Video2 of the beam2 is outputted when a predetermined time period d2_2 passes after production of the main scanning synchronization signal 302/BDO2a2 begins, and then, beam 2 is emitted.

Next, as the main scanning synchronization signal/BDO1a1 (301) is inputted, the video controller 110 performs the operation explained above.

In the second exemplary embodiment, unlike the first exemplary embodiment, the BD producing unit 109 produces the main scanning synchronization signal/BDO1a1 and the main scanning synchronization signal/BDO2a2. Thus, the video controller 110 determines the timing of outputting the video signal in accordance with the main scanning synchronization signal/BDO1a1 and /BDO2a2

By performing the above processing, a similar effect as the first exemplary embodiment can be achieved.

The main scanning synchronization signal/BDI can be detected per one beam while performing the laser light amount control per one beam and the main scanning synchronization signal/BDI can be detected by detecting only the predetermined beam in an appropriate order. Thus, the APC time required between the lines can be shortened. Further, the output main scanning synchronization signal/BDO1a1 or /BDO2a2 need not be produced since the spacing is the same as the input main scanning synchronization signal 201/BDI1 and 202/BDI2, and therefore the BD producing unit 109 can be simplified. Thus, the cost for manufacture can be decreased.

Third Exemplary Embodiment

Figure 4:
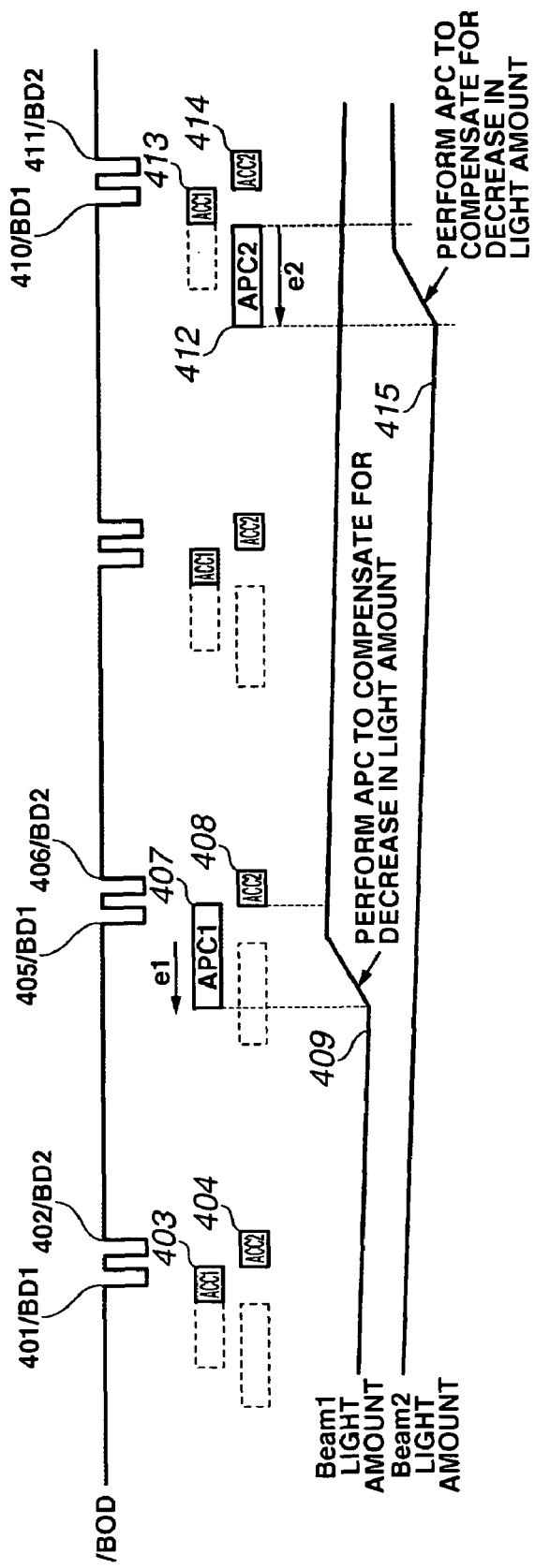
FIG. 4 is a timing chart showing an operation according to a third exemplary embodiment of the present invention.
Figure 5:
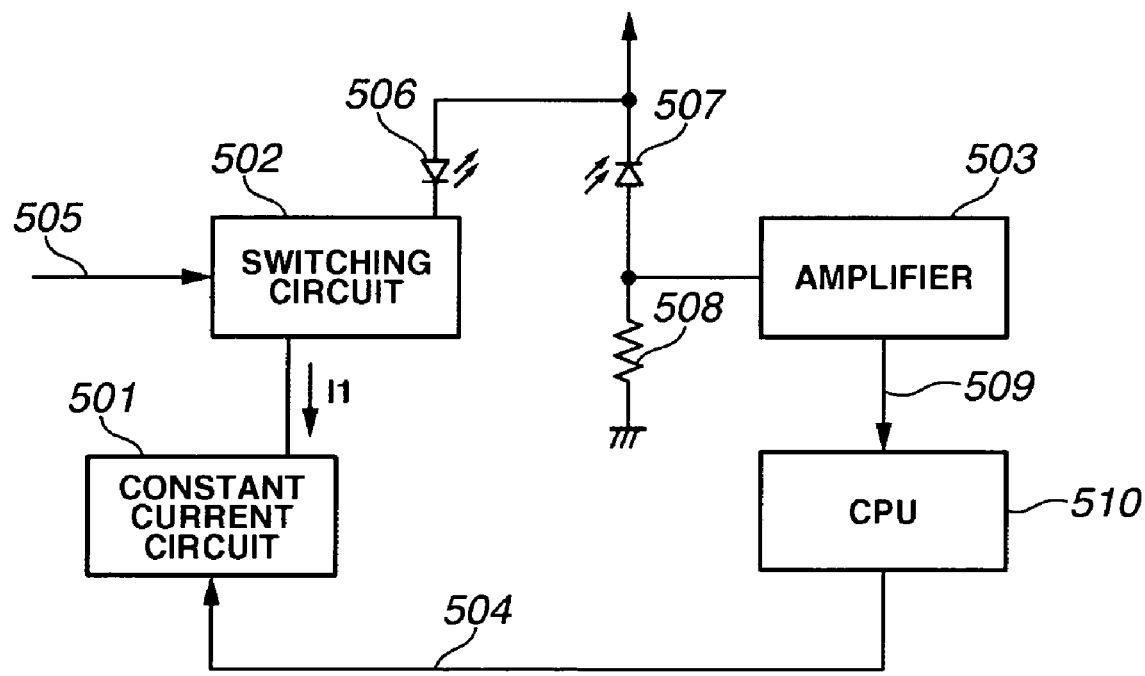
FIG. 5 is a schematic diagram that illustrates a laser control circuit of a conventional device.
Figure 6:
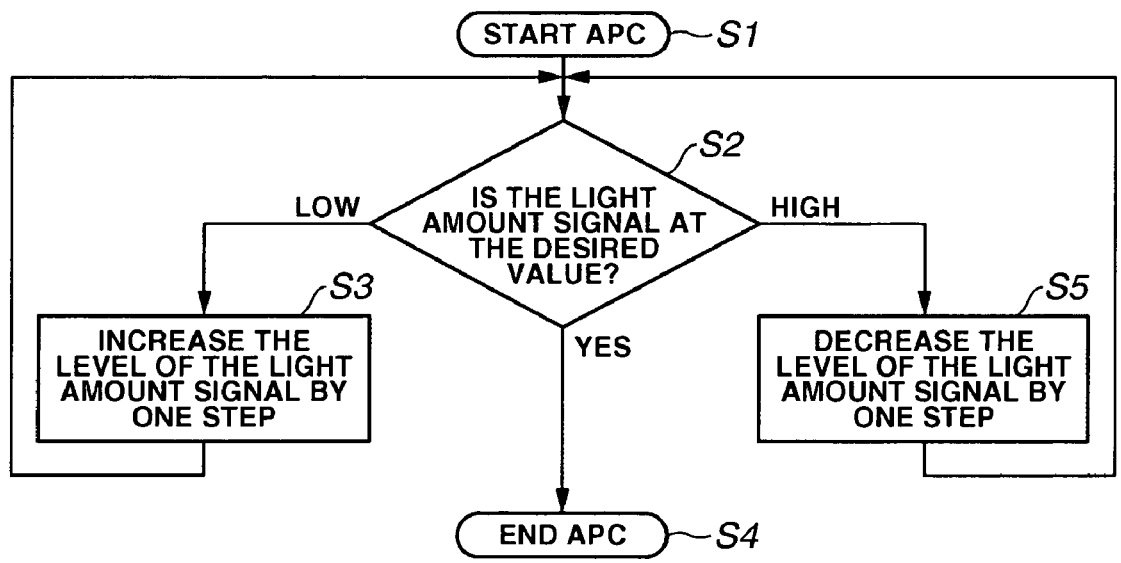
FIG. 6 is a flow chart showing an operation of a laser control according to the conventional device.
Figure 7:
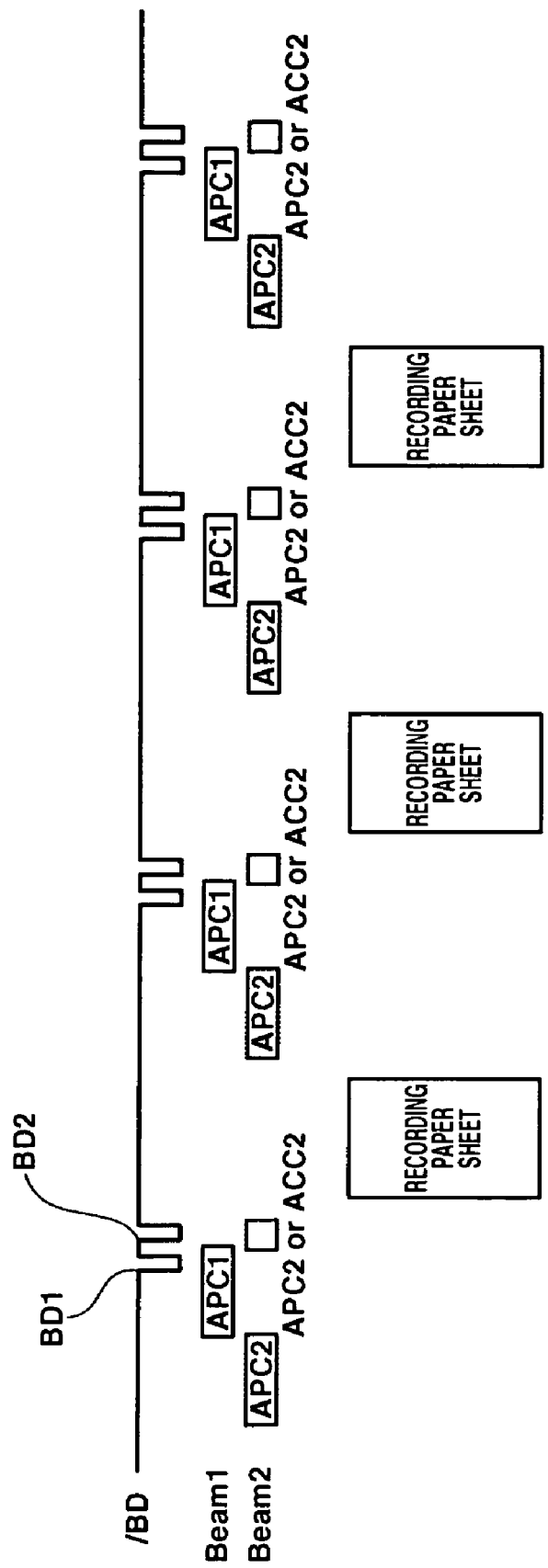
FIG. 7 is a timing chart showing an operation according to the conventional device.

FIG. 4 illustrates a timing chart of the light amount control according to a third exemplary embodiment of the present invention. In addition, also FIG. 1 is used for the explanation of the third exemplary embodiment.

First, as illustrated in FIG. 4, the laser light emission (hereinafter referred to as ACC) of beam 1 ACC1 (403) is performed in which the light amount is not controlled and a main scanning synchronization signal/BD1 (401) is detected. Subsequently, ACC2 (404) (for beam 2) is performed and a main scanning synchronization signal/BD2 (402) is detected. Further, the ACC1 and the ACC2 can be repeated to detect the main scanning synchronization signal/BD1 and the main scanning synchronization signal/BD2, respectively.

Then, when the level of the light amount of beam 1 is decreased and is not at the desired light amount level (409) any more, APC1 (407) is performed earlier than the time of the decrease by an arbitrary or predetermined time e1. In this case, APC1 (407) detects a main scanning synchronization signal/BD1 (405). Then, subsequently, ACC2 (408) is performed to detect a main scanning synchronization signal/BD2 (406).

If the level of the light amount of both beam 1 and beam 2 is equivalent to the desired light amount, ACC1 and ACC2 can be repeated to detect the main scanning synchronization signal/BD1 and /BD2, respectively.

Then, when the level of the light amount of the beam 2 is decreased and is not at the desired light amount level (415) any more, APC2 (412) is performed earlier than the time of the decrease by an arbitrary or predetermined time e2, until ACC is performed to detect the main scanning synchronization signal/BD1. Then, subsequently, ACC1 (413) is performed to detect the main scanning synchronization signal/BD1 (410). Then, subsequently, ACC2 (414) is performed to detect the main scanning synchronization signal/BD2 (411).

Thus, when the level of each beam is decreased and is below the desired light amount level, APC is performed.

In the above processing, the APC time required between lines can be shortened by performing the APC when the level of the laser beam is decreased and is below the desired level.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-139757 filed May 12, 2005, which are hereby incorporated by reference herein in their entirety.

What is claimed is:

1. An image forming apparatus comprising:
   first and second light emitting elements each configured to emit a laser beam;
   a scanner configured to repeatedly scan with laser beams emitted by the first and the second light emitting elements on scanning lines of an image area on a photosensitive member;
   a detector configured to produce a beam detection signal by detecting a laser beam scanned by the scanner in a non-image area;
   a power controller configured to receive a laser beam emitted by the first light emitting element or the second light emitting element and scanned by the scanner in the non-image area, detect a power of the received laser beam, and control a driving current that is supplied to the light emitting element that emitted the received laser beam;
   an emitting controller configured to forcibly cause the first light emitting element or the second light emitting element to emit a laser beam in the non-image area so that the detector detects a laser beam and the power controller controls the driving current while the scanner scans in the non-image area,
   wherein the emitting controller performs a first light emission mode and second light emission mode alternately, per each scanning operation by the scanner in the non-image area,
   wherein, in the first light emission mode, the emitting controller forcibly causes the first light emitting element to emit a laser beam without causing the second light emitting element to emit a laser beam, and, in the second light emission mode, the emitting controller causes the second light emitting element to emit a laser beam without causing the first light emitting element to emit a laser beam; and
   a synchronization controller configured to produce a timing signal for controlling image formation timing of each of the first and second laser beams emitted from the first and second light emitting elements, by delaying output of the beam detection signal by a first predetermined period of time in the first light emission mode, and by delaying output of the beam detection signal by a second predetermined period, which is different from the first predetermined period, of time in the second light emission mode.

2. The image forming apparatus according to claim 1, wherein the image formation is performed after a predetermined length of time unique for each of the first and second light emitting elements, in accordance with the timing signal.

* * * * *